United States Patent [19]

Nagao

[11] Patent Number: 4,546,856
[45] Date of Patent: Oct. 15, 1985

[54] FENDER BEAM AND LIFE LADDER IN ONE

[75] Inventor: Masatoshi Nagao, Kobe, Japan

[73] Assignee: Sumitomo Gomu Kogyo Kabushiki Kaisha, Hyogo, Japan

[21] Appl. No.: 407,912

[22] Filed: Aug. 13, 1982

[30] Foreign Application Priority Data

Aug. 15, 1981 [JP] Japan ............................ 56-121493[U]

[51] Int. Cl.⁴ .......................... E06C 9/00; B63B 21/00
[52] U.S. Cl. ...................................... 182/228; 182/93; 114/219
[58] Field of Search ................ 114/219, 362; 182/93, 182/216, 217, 228, 196, 190, 194

[56] References Cited

U.S. PATENT DOCUMENTS

| 580,324 | 4/1897 | Monroe | 182/228 |
| 3,092,207 | 6/1963 | Larder | 182/228 |
| 3,404,534 | 10/1968 | Cunney | 114/219 |
| 4,198,919 | 4/1980 | Evans | 114/219 |
| 4,319,539 | 3/1982 | Fujii | 114/219 |
| 4,333,547 | 6/1982 | Johansson | 182/196 |

FOREIGN PATENT DOCUMENTS

| 71496 | of 0000 | Fed. Rep. of Germany | 182/216 |
| 11618 | of 1897 | United Kingdom | 182/93 |
| 2811 | of 1912 | United Kingdom | 182/217 |
| 211308 | 2/1924 | United Kingdom | 182/228 |
| 921383 | 3/1963 | United Kingdom | 182/228 |

Primary Examiner—Reinaldo P. Machado
Assistant Examiner—Alvin Chin-Shue
Attorney, Agent, or Firm—Robert E. Burns; Emmanuel J. Lobato; Bruce L. Adams

[57] ABSTRACT

A fender beam and life ladder in one which serves as a life ladder mounted on a wall surface of a quay or the like and extending substantially vertically at least from a water level to an upper end of the quay to help a person who has fallen from the quay and which also serves as a fender beam to prevent a hull from being damaged resulting from the contact thereof with the quay when a ship comes closer to the quay. The fender beam and life ladder has a pair of plate-like elastic members, which are mounted on the wall surface so that one end widthwise of each elastic member is obliquely projected from the wall surface of the quay and the projected ends are opposed in a suitably spaced relation. On the projected ends there are provided plural steps of cross members forming a ladder in a suitably spaced relation.

4 Claims, 8 Drawing Figures

FENDER BEAM AND LIFE LADDER IN ONE

FIELD AND BACKGROUND OF THE INVENTION

The present invention relates to a ladder as a life-saving appliance, which is mounted on a shore installation such as a quay, a pier, etc. of a harbor, to help an operator who is fallen into the water, and more specifically, to a life ladder which also serves as a fender beam which can prevent a ship from being damaged when the ship comes into contact with the quay or the like as it comes closer to the quay.

Today, various ladders and steps are provided in the quay of harbor to serve as of a life-saving appliance for use when a stevedore or the like accidently falls into the water. Ideally, the life-saving appliances of the type as described are installed in a safety spaced relation to a degree such that in a winter season, a person who has fallen into the water wearing winter cloths has energy enough to hold fast onto the life-saving appliance, and to this end, these life-saving appliances must be available at a low cost. Also, these must have an excellent durability and must not be ones which are liable to impart damage to a hull or fittings of a ship which comes closer toward the quay. In addition, the appliances must be easily executed and must not be ones which would expose persons or vehicles passing on the quay to danger.

DESCRIPTION OF PRIOR ART

In a prior art life ladder such as shown in FIG. 1a, a plurality of metal rods 13 of stainless steel are mounted in a ladder like fashion on a wall surface 12 of a quay 11 in a vertically suitably spaced relation. In mounting the metal rods 13, both ends thereof are bent peripherally and at a right angle, and the bent ends are embedded into the wall surface 12. Since this life ladder is projected from the wall surface 12 and exposed, it is liable to be bent by contact thereof with a ship or by floating matter such as driftwood, and particularly in the event a step portion in the neighbourhood of a water level 14 at the lower portion thereof is damaged, the ladder does not perform its function as a life-saving appliance any longer. It is therefore proposed that protective lumber 15 are provided along both sides of the ladder as shown. However, lumber tends to rot and tends to wear by contact thereof with the hull.

In view of the foregoing, proposals have been made, one of which is that as shown in FIG. 1b in which a rectangular vertical groove 16 is provided in the wall surface 12 of the quay 11 and a plurality of metal rods 13 are provided in a ladder fashion between the opposed wall surfaces of the groove 16. Another such proposal is as shown in FIG. 1c wherein steps 17 are provided within the vertical groove 16. These two proposals are preferable in that the ladder is prevented from collision by ships or the like since climb-up means such as metal rods 13 and steps 17 are not projected from the wall surface 12 of the quay 11. However, the wall surface 12 must be dug up and thus a large scale work is required and such work cannot be executed in fact unless the quay is executed. Further such a vertical groove causes the effective length of the quay to be shortened, and particularly, the exposure of such a groove to the upper surface of the quay poses considerable danger to persons and vehicles passing on the quay. Thus, a cover such as an iron plate is usually placed on such an opening of the groove to avoid an inconvenience to normal passing. However, this requires extra troubles of maintenance and in addition, a thick iron plate must be used to provide a cover which can withstand the weight of vehicles. In the structure shown in FIG. 1b, the opening of the groove is not so large but in the structure shown in FIG. 1c, the opening of the groove is large and thus a cover having a large area is necessary and the weight of the cover increases accordingly, which cannot be raised by human hands.

In a life ladder shown in FIG. 1d, a pair of hollow square elastic members 18 are provided on the wall surface 12 of the quay 11 in a suitably spaced relation, and a plurality of cross rubber members 19 incorporating therein a metal chain are extended between the opposed surfaces of the elastic members 18. The elastic members 18 are superior to the aforementioned three prior art structures in that since the elastic members somewhat have a function as a fender beam, they will not damage the hull or the like at the time of light shock even if the members are projected from the wall surface 12, and the members may be easily mounted on the wall surface. However, since the elastic members 18 have a square shape, the rate of deformation is small and the elastic members cannot sufficiently absorb a great shock when it occurs. Moreover, since hollow square shaped columns must be formed with an elastic material, it has been difficult to provide them inexpensively.

On the other hand, in the U.S. Pat. No. 4,319,539 there is proposed a fender device in which cushion members are formed from elastic plates of rubber or synthetic resin. This fender device comprises a pair of cushion members and a shock receiving plate, each cushion member having a mounting flange integrally provided on one end widthwise perpendicular to the lengthwise and a buffer block portion integrally provided on the other end in an axial direction. The mounting flange portion is secured to the wall surface of the quay or the like and the buffer block portion is positioned while being vertically projected from the wall surface and positioned spaced apart from the buffer block portion of the opposed cushion member. The shock receiving plate is supported and fixed between the buffer block portions of the pair of the cushion members. In the U.S. Pat. No. 3,788,082 there is proposed a fender device in which the buffer block portions of the pair of cushion members are extended substantially parallel to the wall surface of the quay, the extended ends being brought into abutment each other, and the shock receiving plate is secured to the foremost end surface of the buffer block. Such a fender device may be provided inexpensively and widely used since the cushion members are in the form of a plate, thus the device is easily deformed and has an excellent shock absorption and the device itself is simple in structure.

Therefore, the present invention provides a fender beam and life ladder in one which uses the aforementioned cushion members while keeping eye on the cushion members of these prior art fender devices.

OBJECTS OF THE INVENTION

It is an object of the present invention to provide inexpensively a combined fender beam and life ladder assembly which is simple in construction and can be easily mounted on the wall surface of the quay or the like.

It is a further object of the invention to provide a combined fender beam and life ladder assembly which is sufficiently projected from the wall surface of the quay to also serve as a fender for ships or the like and is easily machined to mount or stop cross members of the ladder.

In accordance with the present invention, there is provided a combined fender beam and life ladder assembly which comprises a pair of plate-like cushion members and a plurality of cross members extended over one end widthwise of the cushion members and spaced lengthwise of the cushion members. The cushion member is formed of an elastic plate of rubber or synthetic resin and is integrally formed with a mounting flange portion in contact with and secured to the wall surface of the quay or the like, a body portion one end of which is in contact with the mounting flange portion, from which extends obliquely, and a buffer block portion formed on the other end widthwise of the body portion. Both ends of each cross member are mounted on opposed buffer block portions.

In a preferred embodiment, each cross is formed of a flexible material such as a chain or a wire, each cushion member having a buffer block portion in which wire is embedded lengthwise, and the distal end of the cross member is tied to the wire to thereby fix the cross member. The cross member exposed between the buffer block portions is coated with a rubber or synthetic resin material having anti-corrosion and high frictional properties. Preferably, in this case, the coating material is embedded into the buffer block portion to form an integral structure.

DESCRIPTION OF THE PREFERRED EMBODIMENTS

Figure 1A:
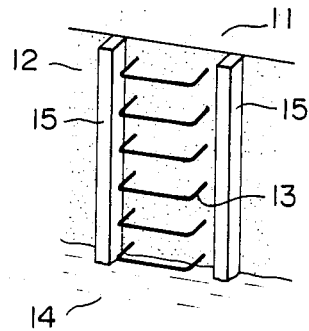
FIGS. 1a–1d are perspective views showing examples of prior art life ladders.
Figure 1B:
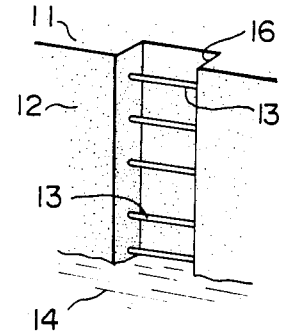
Figure 1C:
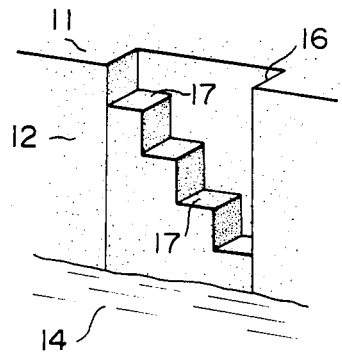
Figure 1D:
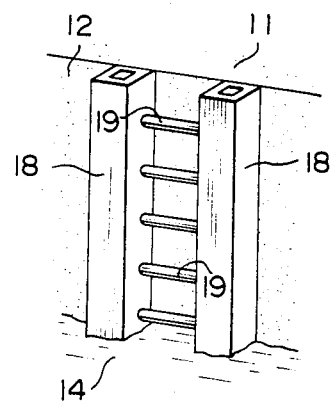
Figure 3:
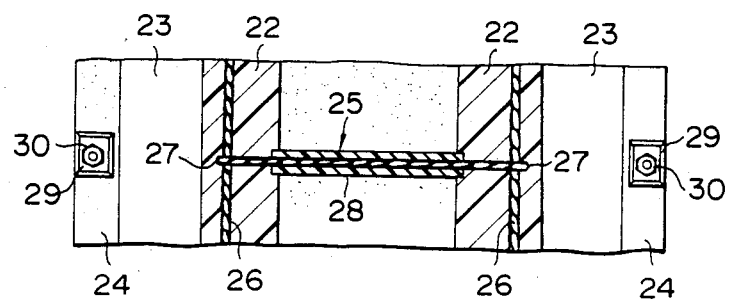
FIG. 3 is a front view showing the FIG. 2 structure partly cutaway.
Figure 2:
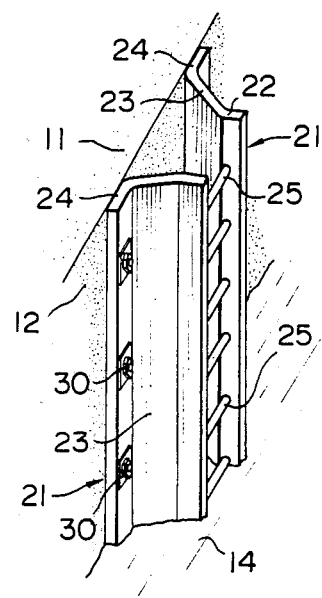
FIG. 2 is a perspective view showing one embodiment of a combined fender beam and life ladder assembly in accordance with the present invention.

Referring to FIGS. 2 and 3, a pair of cushion members are generally indicated at reference numeral 21. Each cushion member 21 is formed of an elastic material of rubber or synthetic resin in the form of a plate and is integrally formed with a buffer block portion 22 positioned substantially vertically with respect to the wall surface 12 of a shore installation such as the quay 11, a body portion 23 one end widthwise of which is in contact with the block portion 22, and a mounting flange portion 24 which is in contact with the other end widthwise of the body portion 23 and extends parallel to the wall surface 12. The widthwise extension of the body portion 23 extends obliquely from the mounting flange portion 24 in a converging direction toward the body portion 23 of the other cushion member, and the pair of cushion members 21 are mounted on the wall surface 12 so that a section thereof is formed into a trapezoid by a line connection two body portions 23 and two buffer block portions 22 and a line connecting two mounting flange portions 24. As shown in FIG. 2, the outermost surface of each buffer block portion 22 is freely exposed and faces away from the quay 11. A cross member 25 is extends between and is connected the opposed buffer block portions 22 and 22 at locations which are inwardly spaced from the freely exposed outermost surfaces thereof. The cross members 25 are provided in plural in a suitably spaced relation along the lengthwise direction of the buffer block portion 22. The cross member 25 is composed of a lateral wire 27 each end of which is secured to a longitudinal wire 26 extended lengthwise in the block portion 23 and a rubber sleeve 28 which covers the outer periphery of the lateral wire 27. The lateral wire 27 and longitudinal wire 26 are fixed by connecting both ends of the lateral wire 27 in a ring-like form and inserting the longitudinal wire 26 into the ring. However, if these two wires 26 and 27 are made of metal, they can be welded together. The mounting flange portion 24 is secured to the wall surface 12 by means of a bolt 30 through a washer 29.

The shape of the cushion member 21 is the same as that of the aforesaid U.S. Pat. No. 4,319,539 except the absence of a shoulder for supporting a shock receiving plate formed from the cushion member to the foremost end of the buffer block portion. In a mould for making the cushion member according to said patent, the mould may be used merely by burying a mould portion which forms the shoulder, and therefore, equipment cost for manufacturing cushion members may be reduced. Mounting thereof an the wall surface of the quay 11 can be achieved by a simple operation, that is, merely by locating a pair of cushion member vertically with respect to a horizontal surface, and thereafter hammering the bolt 30 into the mounting flange portion 24 through the washer 29, and since the mounting flange portion 24 is located outside, the operation therefor is very easy. The cross members 25 forming a ladder are projected from the wall surface 12 through the widthwise extending obliquely of the body portion 23 of the cushion member 21, and thus the distance enough to put one's feet between the wall surface 12 and the cross member 25 may be formed.

Figure 4:
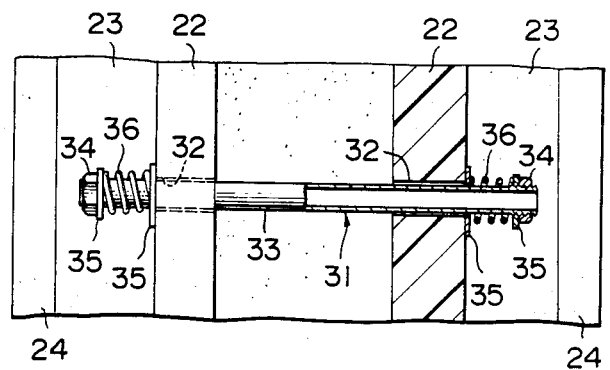
FIG. 4 is a partly cutaway front view showing another embodiment of a cross member.

FIG. 4 illustrates another embodiment of the cross member 31, in which a bore 32 is formed which extends through opposed buffer block portions 22, 22 of the cushion member, and the cross member 31 is inserted into and supported in the bore 32. The cross member 31 is formed from a metal pipe 33 of stainless steel and has a sufficient length so that opposite ends thereof projects beyond each buffer block portion 22, the cross member having both foremost ends on which bolts 34 are threaded, and coil springs 36 are respectively fitted between the bolts and block portions 22 through washers 35. This spring 36 has a function so that the cross member 31 is made to be stationary in a fixed position with respect to the cushion member. Mounting of the lateral member in this embodiment is much simpler than that of the first-mentioned embodiment, and even if the cushion member is deformed for a while due to the contact thereof with the ship, the cross member 31 can be slidably moved freely without being restricted by such deformation and can return to its predetermined position immediately as the cushion member restores.

Figure 5:
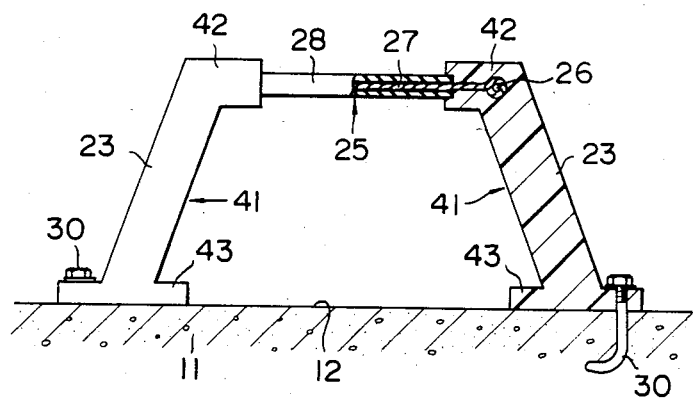
FIG. 5 is a top view showing another embodiment of the present invention partly cutaway.

While in the above-mentioned embodiment, the buffer block portion of the cushion member excludes a shoulder for supporting a shock receiving plate in the aforesaid U.S. Pat. No. 4,319,539, the FIG. 5 embodiment is designed so that the buffer block portion is in the shape of a shoulder 42 as described above in the cushion member 41, the cross member 25 has its end supported and secured to the shoulder 42. It is also designed that the mounting flange portion 43 also extends internally of the opposed cushion members 41, 41. Other parts are the same as those of the above-described embodiment, and thus, like parts bear like reference numerals to omit the detailed description thereof.

What is claimed is:

1. A combined fender and life ladder assembly mountable in use on a sidewall of a shore installation, the assembly comprising: a pair of elongate elastic plate-like members mountable in spaced apart side-by-side relation, each plate-like member having a mounting flange portion extending lengthwise thereof for mounting the plate-like member on a sidewall of a shore installation during use of the assembly, a buffer block portion extending lengthwise of the plate-like member and having a freely exposed lengthwise extending outermost surface, and a body portion extending lengthwise of the plate-like member and being connected along the length thereof at one widthwise end to the mounting flange portion and being connected along the length thereof at the other widthwise end to the buffer block portion, the two body portions extending obliquely outwardly in converging directions from their respective mounting flange portions so that the two buffer block portions lie in juxtaposed spaced-apart relation a smaller distance apart than the two mounting flange portions; and a plurality of rung members connected crosswise to the two spaced-apart buffer block portions in spaced relation along the length thereof, the two buffer block portions having pairs of aligned openings through which extend the opposite end portions of respective ones of the rung members, the rung member end portions projecting outwardly beyond the buffer block portions, biasing means comprising a coil spring disposed over each of the projecting opposite end portions of the rung members for biasing the opposite end portions of each rung member in opposite axial directions, and each rung member having opposite end portions connected to respective ones of the two buffer block portions at locations inwardly spaced from the freely exposed outermost surfaces thereof thereby protecting the rung members and enabling them to be used as the rungs of a life ladder.

2. A combined fender and life ladder assembly according to claim 1; wherein the two mounting flange portions lie in a common plane and the two buffer block portions lie in separate but generally parallel planes which extend transversely of the common plane.

3. A combined fender and life ladder according to claim 2; wherein the pair of plate-like members have a substantially uniform thickness.

4. A combined fender and life ladder according to claim 2; wherein the rung members comprise metal bars.

* * * * *